United States Patent [19]
Koo

[11] Patent Number: 6,147,473
[45] Date of Patent: Nov. 14, 2000

[54] ELECTRIC CAR BATTERY PACK CHARGING DEVICE AND A METHOD

[75] Inventor: Jae-Seung Koo, Kyungki-do, Rep. of Korea

[73] Assignee: Hyundai Motor Company, Seoul, Rep. of Korea

[21] Appl. No.: 09/456,134

[22] Filed: Dec. 7, 1999

[30] Foreign Application Priority Data

Jul. 8, 1999 [KR] Rep. of Korea ................. 99-27515

[51] Int. Cl.$^7$ .................................................. H02J 7/00
[52] U.S. Cl. ......................... 320/160; 320/162; 320/125
[58] Field of Search ................................. 320/162, 160, 320/125

[56] References Cited

U.S. PATENT DOCUMENTS

| | | | |
|---|---|---|---|
| 5,680,030 | 10/1997 | Kadouchi et al. | 320/134 |
| 5,696,436 | 12/1997 | Kim et al. | 320/160 |
| 5,736,834 | 4/1998 | Kumo | 320/146 |
| 5,886,500 | 3/1999 | Iwatani et al. | 320/104 |
| 6,020,722 | 2/2000 | Freiman | 320/164 |
| 6,057,665 | 5/2000 | Herniter et al. | 320/101 |

*Primary Examiner*—Peter S. Wong
*Assistant Examiner*—Gregory J. Toatley, Jr.
*Attorney, Agent, or Firm*—Christie, Parker & Hale, LLP

[57] ABSTRACT

Disclosed is a device and method for charging an electric car battery pack that charges by receiving power and discharges to supply power. A battery charging controller controls charging the battery pack at a constant power, and when the voltage of the battery pack is over a first voltage, controls a constant current charging process, and after this, each time a peak value of the battery pack is over a second voltage, controls a sequential reduction of current and performs a constant current charging process, and when the voltage of the battery pack is over a third voltage, controls a constant current charging process at a fourth voltage, and when the charging voltage is over a fifth voltage, controls a termination of the charging process. A battery charger receives external power according to the control of the battery charging controller, and charges the battery.

8 Claims, 4 Drawing Sheets

ELECTRIC CAR BATTERY PACK CHARGING DEVICE AND A METHOD

BACKGROUND OF THE INVENTION (a) Field of the Invention

The present invention relates to an electric car. More specifically, the present invention relates to a device and method for charging a battery pack of an electric car.

(b) Description of the Related Art

Different from an internal combustion engine driven car, an electric car moves using the limited energy of a battery comprised of modules. When the energy is exhausted, the battery must be charged with external power.

FIG. 1 is a voltage waveform graph of a battery charging method according to prior art provided by the Hawker Company. As shown, the battery is charged in the three stages of constant power (CP), a first constant voltage (CV1), and a second constant voltage (CV2).

The switching of each of these charging stages is as follows.

When a charging process is performed using the constant power and the voltage of the battery pack reaches a value equivalent to 14.7 volts (V)× number of modules, the first constant power stage is switched to the second stage. It takes about two hours for the switch to occur from the first stage to the second stage.

In the second stage, the battery is charged at a constant voltage of 14.7 volts. The completion of the second stage takes about 2.5 times the duration of the first stage, that is, about 5 hours.

In the third stage, the battery is charged at a constant voltage of 15.8 volts. The completion of the third stage takes about 0.5 times the duration of the first stage, that is, about one hour, and cannot exceed one hour.

However, as shown in FIG. 1, it is impossible to monitor the battery modules because of severe unbalances associated with the second and third stages which are caused by the different gassing characteristics of the battery modules. Also, since control operations in the second and third stages are performed according to elapsed time, diffusion can occur in those cases where any of the modules fail to charge.

In the event that a state of charge (SOC) of a lead acid battery is over 80%, charging voltage characteristics vary depend on input current because of different individual module gassing characteristics. This phenomenon leads to problems in battery charge control and residual capacity computation since a battery management system (BMS) is influenced by battery imbalance and failure phenomena.

SUMMARY OF THE INVENTION

It is an object of the present invention to provide a device and method for charging a battery pack of an electric car by switching charging stages by use of a relationship of charging current versus charging voltage, and monitoring the status of each the modules in real-time to increase safety.

In one aspect of the present invention, a battery charging device of an electric car comprises a battery pack that charges by receiving power and discharges to supply power; a battery charging controller controlling a charging of the battery pack at a constant power, and when the voltage of the battery pack is over a first voltage, controlling a performance of a constant current charging process, and after this, each time a peak value of the battery pack is over a second voltage, controlling a sequential reduction of current and performing a constant current charging process, and when the voltage of the battery pack is over a third voltage, controlling a performance of a constant voltage charging process at a fourth voltage, and when the charging voltage is over a fifth voltage, controlling the completion of the charging process; and a battery charger receiving external power according to the control of the battery charging controller, and charging the battery, thereby, preventing malfunction of the battery pack and increasing safety.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
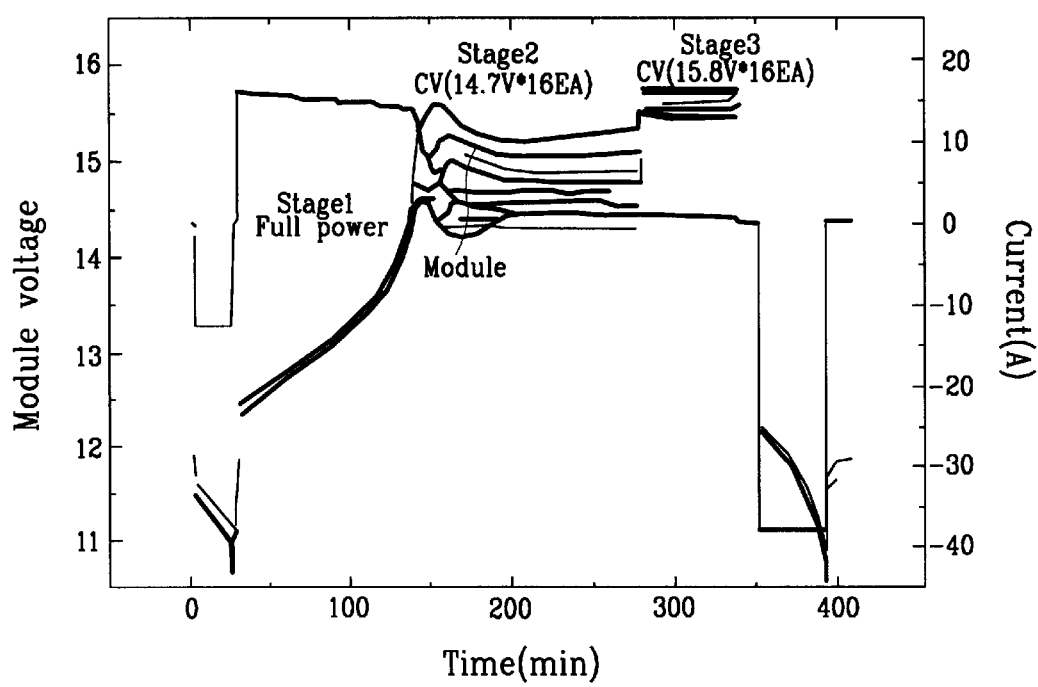
FIG. 1 is a waveform of voltage verses time for a charging of a conventional battery pack.
Figure 2:
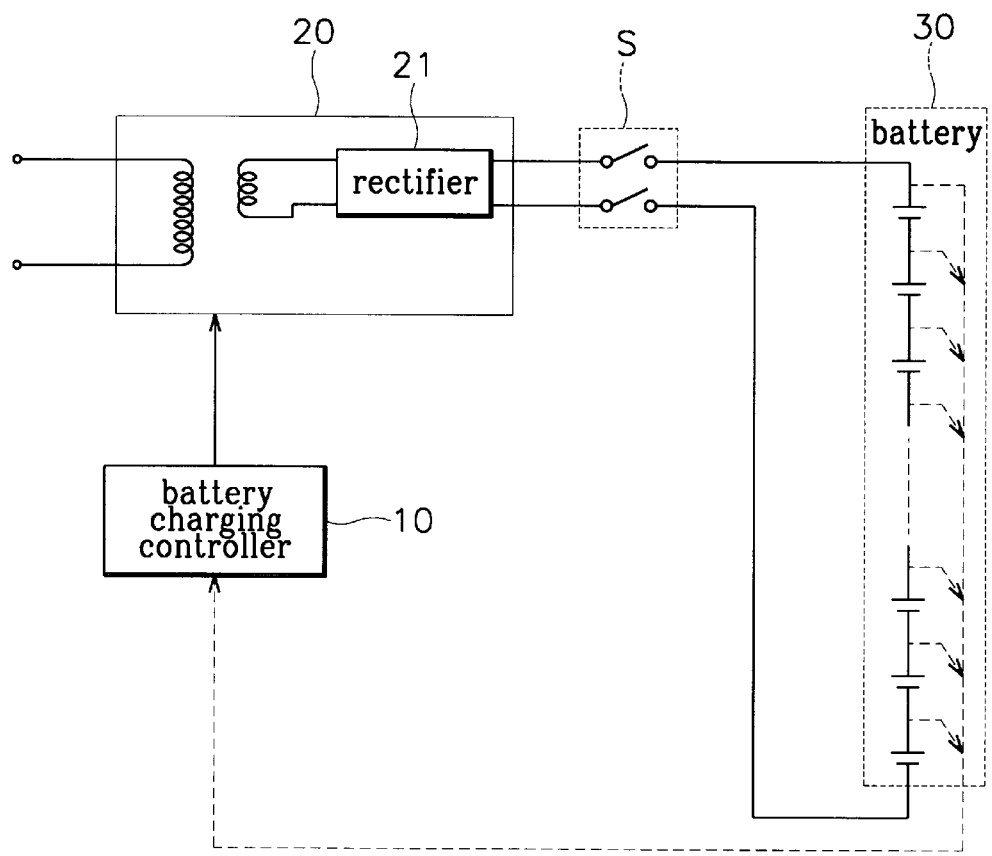
FIG. 2 is a schematic diagram of a battery pack charging device according to a preferred embodiment of the present invention.

FIG. 2 is a schematic drawing of a battery pack charging device according to a preferred embodiment of the present invention.

As shown, the battery pack charging device of an electric car comprises a battery charging controller 10, a battery charger 20, and a battery pack 30.

The battery charging controller 10 checks the status of the battery pack 30, and outputs a control signal to charge the battery pack 30. The battery charger 20 converts externally supplied power into direct current (DC) power, and when a switch S is turned on, outputs an electrical signal to charge the battery pack 30.

Operation of the battery charging device of the electric car will now be described according to a preferred embodiment of the present invention referring to FIGS. 2 through 4.

Figure 3:
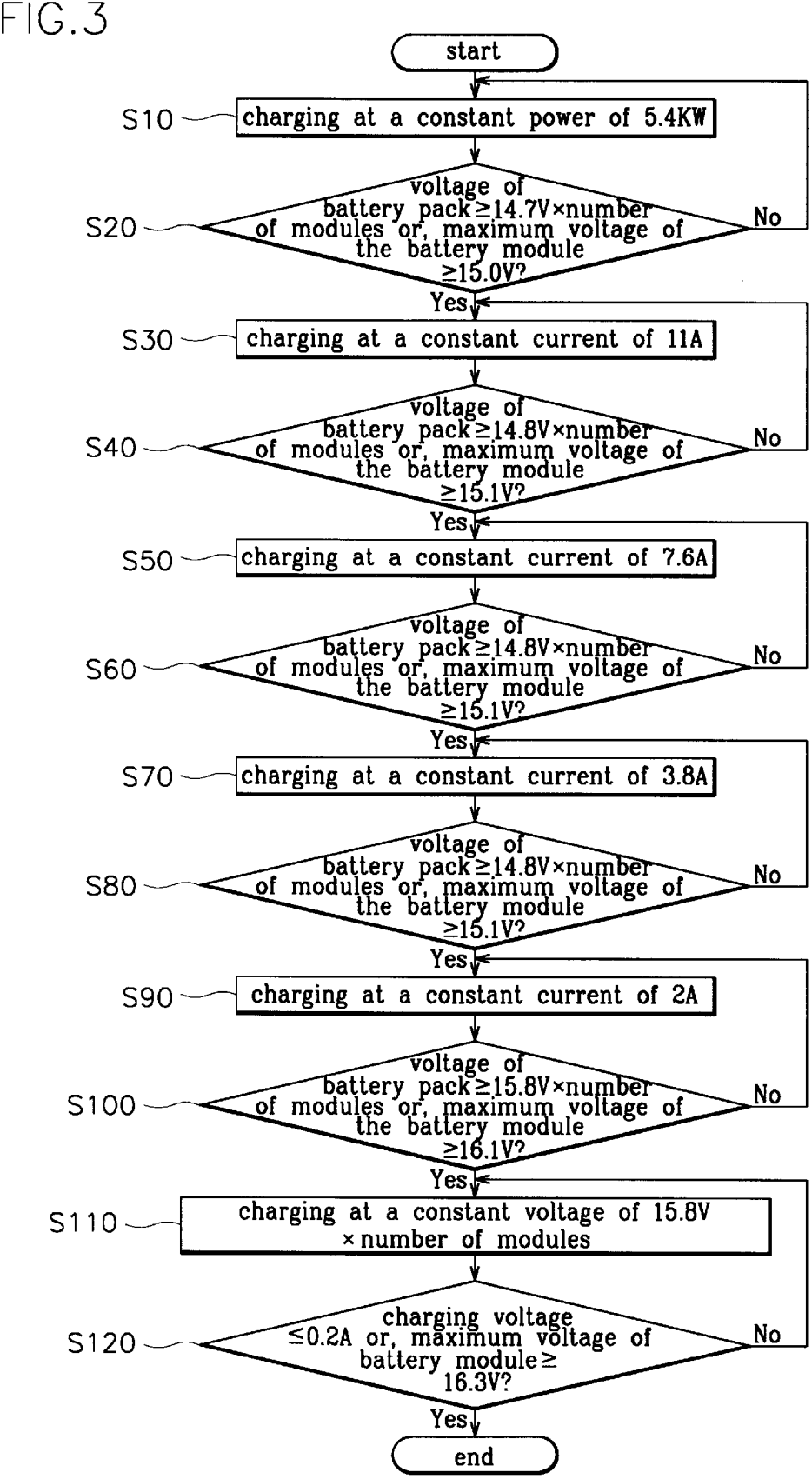
FIG. 3 is a flow chart of a battery pack charging method according to a preferred embodiment of the present invention.
Figure 4:
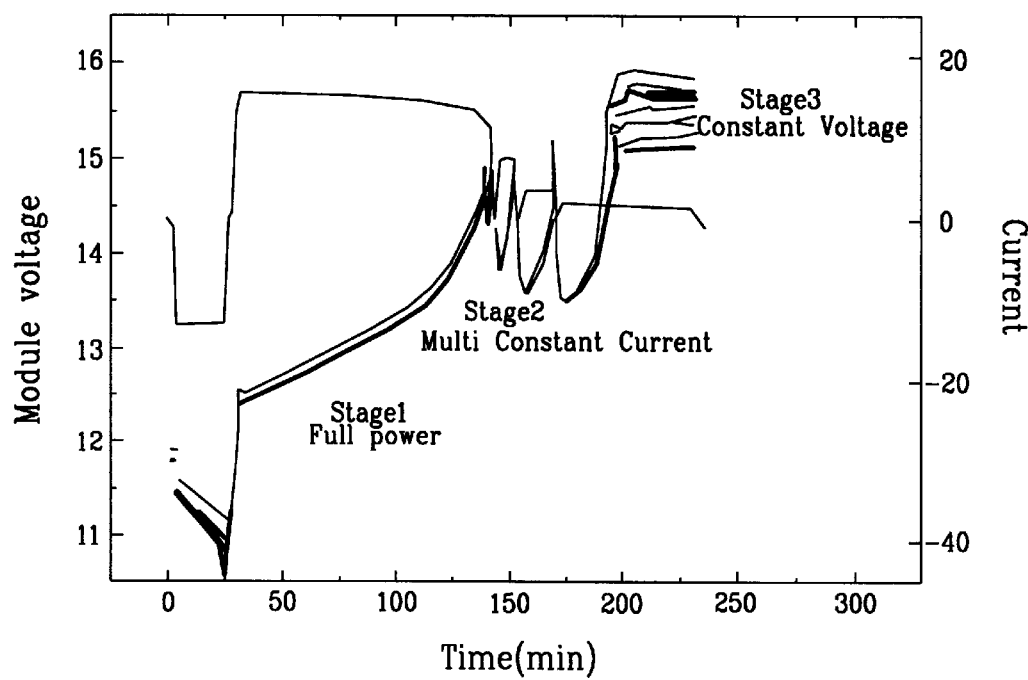
FIG. 4 represents the results of a charging test of a battery pack of an electric car according to a preferred embodiment of the present invention.

FIG. 3 is a flow chart of a battery pack charging method according to a preferred embodiment of the present invention, and FIG. 4 represents the results of a charging test of a battery pack of an electric car according to a preferred embodiment of the present invention.

When a user is driving an electric car and the battery is discharged, the user stops the car and connects a plug to alternating current (AC) power and turns on the switch S to charge the battery pack. The battery charging controller 10 then detects the initial charging status (SOCinitial) of the battery pack 30 in step s20, and controls the battery charger 20 to charge the battery pack 30.

External three phase AC power is converted into DC power through a rectifier 21 of the battery charger 20, and the battery pack 30 is charged using 5.4 kilowatt (kW) converted power in step s10. Simultaneously, the battery charging controller 10 detects the charging voltage of the battery pack 30 in step s20.

If the charging voltage of the battery pack is a value equivalent to 14.7 V× the number of modules, or if a maximum voltage of a module among the modules of the battery pack 30 is over 15.0 V, the battery charging controller 10 controls the battery charger 20 to charge the battery pack at a constant 11 amperes (A) in step s30 (refer to the charging waveform of FIG. 4).

In this charged status shown in FIG. 4, if the charging voltage of the battery pack 30 is at a value equivalent to 14.8 V× the number of modules, or if a maximum voltage of a module among the modules of the battery pack 30 is over 15.1 V in step s40, the battery charging controller 10 controls the battery charger 20 to charge the battery pack at a constant 7.6 A in step s50.

As shown in FIG. 4, if the charging voltage of the battery pack 30 is at a value equivalent to 14.8 V× the number of modules, or if a maximum voltage of a module among the modules of the battery pack 30 is over 15.1 V in step s60, the battery charging controller 10 controls the battery charger 20 to charge the battery pack at a constant 3.8 A in step s70.

In this charged status as shown in FIG. 4, if the charging voltage of the battery pack 30 is at a value equivalent to 14.8 V× the number of modules, or if a maximum voltage of a module among the modules of the battery pack 30 is over 15.1 V in step s80, the battery charging controller 10 controls the battery charger 20 to charge the battery pack at a constant 2 A in step s90.

In this charged status, if the charging voltage of the battery pack 30 is at a value equivalent to 15.8 V× the number of modules, or if a maximum voltage of a module among the modules of the battery pack 30 is over 16.1 V in step s100, the battery charging controller 10 controls the battery charger 20 to charge the battery pack 30 at a voltage equivalent to 15.8 V× the number of modules in step s110.

In this status, if charged current of the battery pack 30 is below 0.2 A or a maximum voltage of a module among the modules of the battery pack 30 is over 16.3 V in step s120, the charging process is terminated in step s110. At this point, the constant voltage charge time must be longer than one hour.

The present invention performs multiple constant current charging processes to minimize the variation of charging voltage characteristics caused by different gassing characteristics when the charging status of the lead acid battery of the electric car exceeds 80%. Following this, since there is little current provided and no great difference of the output voltage, it performs a constant voltage charging process to prevent malfunction of the battery pack and increases safety.

While this invention has been described in connection with what is presently considered to be the most practical and preferred embodiment, it is to be understood that the invention is not limited to the disclosed embodiments. On the contrary, this invention is intended to cover various modifications and equivalent arrangements included within the spirit and scope of the appended claims.

What is claimed is:

1. A battery charging device of an electric car, comprising:
   a battery pack receiving power to charge and discharging to supply power;
   a battery charging controller controlling a charging of the battery pack at a constant power, and when a voltage of the battery pack is over a first voltage, controlling a constant current charging process, and after this, each time a peak value of the battery pack is over a second voltage, controlling a sequential reduction of current and performing a constant current charging process, and when the voltage of the battery pack is over a third voltage, controlling a constant voltage charging process at a fourth voltage, and when the charging voltage is over a fifth voltage, controlling a termination of the charging process; and
   a battery charger receiving external power according to the control of the battery charging controller, and charging the battery.

2. The device of claim 1, wherein the battery charging controller charges the battery pack at a first constant current during a constant current charging process, and when the voltage of the battery pack is over the second voltage, the battery charging controller charges the battery pack at a second constant current, and when the voltage of the battery pack is again over the second voltage, the battery charging controller charges the battery pack at a third constant current, and when the voltage of the battery pack is again over the third voltage, the battery charging controller charges the battery pack at a fourth constant current.

3. A method for charging a battery pack of an electric car, comprising the steps of:
   (a) charging a battery pack at a constant power and determining whether a voltage of the battery pack is over a first voltage;
   (b) charging the battery pack at a constant current when the voltage of the battery pack is over the first voltage, and each time a peak value of the voltage of the battery pack is over a second voltage, sequentially reducing the current and charging the battery pack at a constant current; and
   (c) charging the battery pack at a fourth constant voltage when the voltage of the battery pack is over a third voltage, and terminating the charging process when the charging voltage is over a fifth voltage.

4. The method of claim 3, wherein the step (b) is characterized in that the battery pack is charged at the first constant current, and when the voltage of the battery pack is over the second voltage, the battery pack is charged at the second constant current, and when the voltage of the battery pack is again over the second voltage, the battery pack is charged at the third constant current, and when the voltage of the battery pack is over the third voltage, the battery pack is charged at the fourth constant current.

5. The method of claim 3, wherein the step (b) is characterized in that the battery pack is charged at a first constant current, and when a maximum voltage of a module of the battery pack is over the first voltage, the battery pack is charged at a second constant current, and when the voltage is again over second voltage, the battery pack is charged at a third constant current, and when the voltage is again over third voltage, the battery pack is charged at a fourth constant current.

6. The method of claim 5, wherein the step (b) is characterized in that when the battery pack is charged at the fourth constant current, and when the voltage of one or more of the modules of the battery pack is over the fourth voltage, the step (c) commences.

7. The method of claim 3, wherein the step (a) is characterized in that when the battery pack is charged at a constant power, and when the voltage of one or more modules of the battery pack is over the fourth voltage, the step (b) commences.

8. The method of claim 4, wherein the step (c) is characterized in that when the battery pack is charged at a fourth constant voltage, and when the voltage of one or more modules of the battery pack is over the fifth voltage, the charging process is terminated.

\* \* \* \* \*